US005546311A

United States Patent [19]

Sekine

[11] Patent Number: 5,546,311

[45] Date of Patent: Aug. 13, 1996

[54] INTERCOMMUNICATION SYSTEM FOR VEHICLE

[75] Inventor: Hiroshi Sekine, Wako, Japan

[73] Assignee: Honda Giken Kogyo Kabushiki Kaisha, Tokyo, Japan

[21] Appl. No.: 329,901

[22] Filed: Oct. 27, 1994

[30] Foreign Application Priority Data

Oct. 28, 1993 [JP] Japan .................................... 5-269361

[51] Int. Cl.[6] .................................................. G06F 165/00

[52] U.S. Cl. .......................... 364/449; 364/443; 364/436; 364/461; 340/902; 340/990; 340/995

[58] Field of Search .................................... 364/443, 444, 364/449, 436, 460–461; 73/178 R; 340/902, 905, 988, 990, 995; 180/167, 168, 169

[56] References Cited

U.S. PATENT DOCUMENTS

| | | | |
|---|---|---|---|
| 4,706,086 | 11/1987 | Panizza | 364/436 |
| 4,937,752 | 6/1990 | Nanba et al. | 364/449 |
| 5,067,082 | 11/1991 | Nimura et al. | 364/444 |
| 5,146,219 | 9/1992 | Zechnall . | |
| 5,184,123 | 2/1993 | Bremer et al. | 364/449 |
| 5,289,181 | 2/1994 | Watanabe et al. | 340/902 |
| 5,315,295 | 5/1994 | Fujii | 340/905 |
| 5,357,438 | 10/1994 | Davidian | 364/461 |
| 5,428,544 | 6/1995 | Shyu | 364/436 |
| 5,444,629 | 8/1995 | Kishi et al. | 364/449 |

FOREIGN PATENT DOCUMENTS

| | | |
|---|---|---|
| 0543543 | 5/1993 | European Pat. Off. . |
| 4139008A1 | 6/1992 | Germany . |
| 4201142A1 | 8/1992 | Germany . |
| 62-142216 | 6/1987 | Japan . |
| 1217210 | 8/1989 | Japan . |
| 2141899 | 5/1990 | Japan . |
| 290200 | 10/1992 | Japan . |
| 2250619 | 6/1992 | United Kingdom . |

*Primary Examiner*—Gary Chin
*Attorney, Agent, or Firm*—Weiner, Carrier & Burt, P.C.; Joseph P. Carrier; Irving M. Weiner

[57] ABSTRACT

An intercommunication system for a vehicle is disclosed including a judging mechanism for detecting whether a corner exists ahead of a subject vehicle in a traveling direction on a road based on outputs from a navigating mechanism and a map information outputting mechanism in a navigation system. It is judged whether the vehicle speed of the subject vehicle is excessive or an overspeed for safely passing through a detected corner. If the vehicle speed of the subject vehicle is an overspeed, the speed of the vehicle is reduced through an automatic vehicle speed control mechanism and/or an alarm means which alerts the vehicle driver of the overspeed condition. A mechanism is also provided for detecting whether another vehicle is traveling through or approaching a detected corner. If another vehicle is detected, when the subject vehicle reaches a position which is a predetermined distance short of the corner, intercommunication between the subject vehicle and the other vehicle passing through the corner is initiated pertaining to the vehicle speed, the traveling direction and the like through the communication means, so that the subject vehicle can safely and reliably pass by the other vehicle.

20 Claims, 12 Drawing Sheets

When vehicle speed is small

When vehicle speed is large

INTERCOMMUNICATION SYSTEM FOR VEHICLE

BACKGROUND OF THE INVENTION

1. Field of the Invention

The present invention relates to an intercommunication system for a vehicle which is designed to ensure that the vehicle can easily and reliably pass through a road ahead thereof by utilizing a so-called navigation system which includes a map information outputting means for outputting a map of a road on which the subject vehicle travels, and a navigating means which outputs the current position and the like of the subject vehicle on the map.

2. Description of Relevant Art

There is a conventionally known intercommunication system in which an intersection ahead of a subject vehicle in a traveling direction is recognized by utilizing a navigation system, and the subject vehicle is put into intercommunication with another vehicle approaching such intersection about traveling conditions of the subject vehicle and the other vehicle, thereby preventing the vehicles from colliding with each other as they meet at the intersection (see Japanese Patent Application Laid-Open No. 290200/92).

However, the above known intercommunication system suffers from a problem that a corner ahead of the subject vehicle in the traveling direction is not recognized and hence, information about another vehicle cannot be given to a subject vehicle's driver prior to the passing of the subject vehicle by the other vehicle at the corner.

SUMMARY OF THE INVENTION

Accordingly, it is an object of the present invention to ensure that the information about another vehicle entering a road ahead of the subject vehicle can reliably be given to a subject vehicle's driver regardless of the curvature of the road, thereby permitting the subject vehicle to easily and reliably pass through a road ahead thereof.

To achieve the above object, according to the present invention, there is provided an intercommunication system for a vehicle, comprising a map information outputting means for outputting a map of a road on which a subject vehicle travels, a navigating means which outputs a traveling direction and a current position of the subject vehicle on the map, a vehicle speed judging means for judging whether the vehicle speed of the subject vehicle is suitable for the shape of a road ahead of the subject vehicle, which is detected on the basis of outputs from the map information outputting means and the navigating means, a communication means for transmitting a traveling condition of the subject vehicle to another vehicle on the basis of an output from the vehicle speed judging means and for receiving a traveling condition of the other vehicle transmitted from the other vehicle, and an alarm means for giving an alarm to a subject vehicle's driver on the basis of the received traveling condition of the other vehicle.

With the above arrangement, the shape of the road ahead of the subject vehicle is detected, and it is judged whether the vehicle speed of the subject vehicle is suitable for passing through a road ahead thereof. The intercommunication is conducted about such information between the subject vehicle and the other vehicle to give an alarm to the driver. Therefore, it is possible for the subject vehicle's driver to know information about the other vehicle by which the subject vehicle passes, thereby permitting the subject vehicle to easily and reliably pass through the road ahead thereof.

BRIEF DESCRIPTION OF THE DRAWINGS

FIGS. 1 to 9 illustrate a first embodiment of the present invention, wherein FIG. 1 is a block diagram of the entire arrangement of an intercommunication system according to the present invention;

FIG. 2 is a first portion of a flow chart illustrating the operation of the first embodiment;

FIG. 3 is a second portion of the flow chart illustrating the operation of the first embodiment;

FIG. 4 is a diagram for explaining the operation when the vehicle speed is low;

FIG. 5 is a diagram for explaining the operation when the vehicle speed is high;

FIG. 6 is a diagram for explaining the operation when a road is within a passable area;

FIG. 7 is a diagram for explaining the operation when a road is out of the passable area;

FIG. 8 is a diagram for explaining he determination of a passable vehicle speed; and FIG. 9 is a diagram for explaining the operation when a subject vehicle and another vehicle pass through a corner;

DETAILED DESCRIPTION OF THE PREFERRED EMBODIMENTS

A first embodiment of the present invention will now be described in connection with FIGS. 1 to 9.

Figure 1:
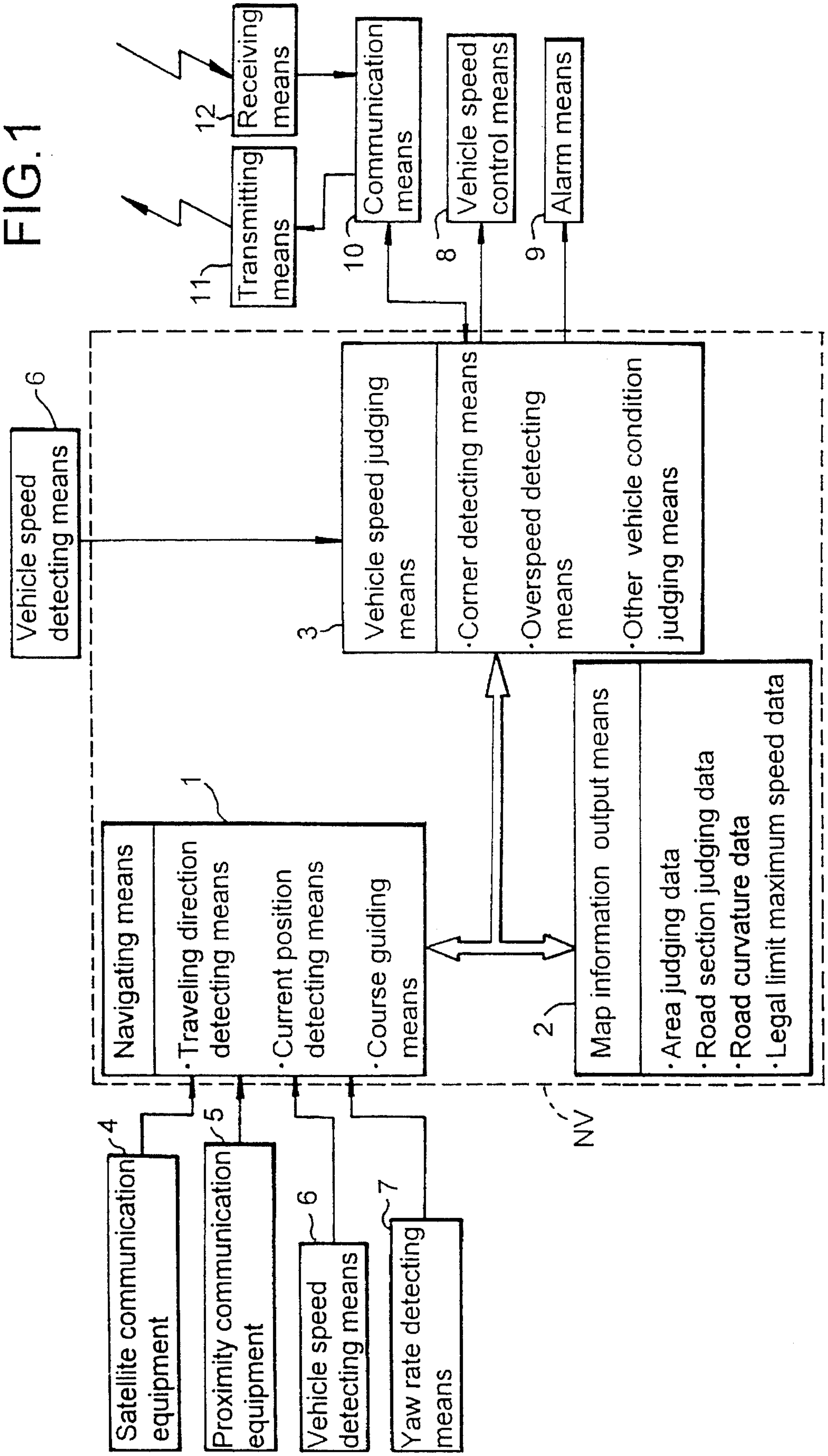

Referring to FIG. 1, a navigation system NV for a vehicle includes a navigating means 1, a map information outputting means 2 and a vehicle speed judging means 3 therein.

Various information from a satellite communication equipment 4 or a proximity communication equipment 5, signals from a vehicle speed detecting means 6 and a yaw rate detecting means 7 and map data from the map information outputting means 2 are supplied to the navigating means 1. The navigating means 1 includes a traveling-direction detecting means for determining the traveling direction of a subject vehicle on a road in a map, a current position detecting means for determining the current position of the subject vehicle, a course guiding means for determining a course to a destination to guide the vehicle thereto, and the like.

The map information outputting means 2 using an IC card or CD-ROM outputs area judging data for judging an area where the subject vehicle is traveling (an urban road, a suburban road, a mountain road or the like), road section judging data for judging a road suction such as a highway, a driveway, the number of traffic lanes and the like, road curvature data for providing the degree of curve of a road, legal maximum speed limit data for providing a legal maximum speed limit on a road, and the like.

The vehicle speed judging means 3 includes a corner detecting means for detecting whether there is a corner existing ahead of the subject vehicle on a road on which the subject vehicle is traveling on the basis of outputs from the navigating means 1, the map information outputting means 2 and the vehicle speed detecting means 6, an overspeed detecting means for detecting whether the speed of the subject vehicle is too large as compared with an appropriate speed suitable for the vehicle to pass through a corner, an other-vehicle condition judging means for judging a received traveling condition of another vehicle, and the like.

A vehicle speed control means 8, an alarm means 9 and a communication means 10 are connected to the vehicle speed judging means 3. The communication means 10 is further connected to a transmitting means 11 and receiving means 12. The vehicle speed control means 8 is comprised of an auto-cruising device and a brake device, and performs a speed-reducing control when the vehicle speed of the vehicle at a time of entering a corner is too high. The alarm means 9 is comprised of a lamp, a chime, a buzzer or CRT, and attracts a driver's attention when the vehicle speed of the subject vehicle is too large, or in accordance with the condition of another vehicle. The communication means 10 permits a wireless communication between the subject vehicle and another vehicle which is traveling through a corner where the subject vehicle is traveling, or which the subject vehicle is intended to enter, or another vehicle intended to enter such corner.

The operation of this embodiment will be described below in detail with reference to flow charts shown in FIGS. 2 and 3.

Figure 4:
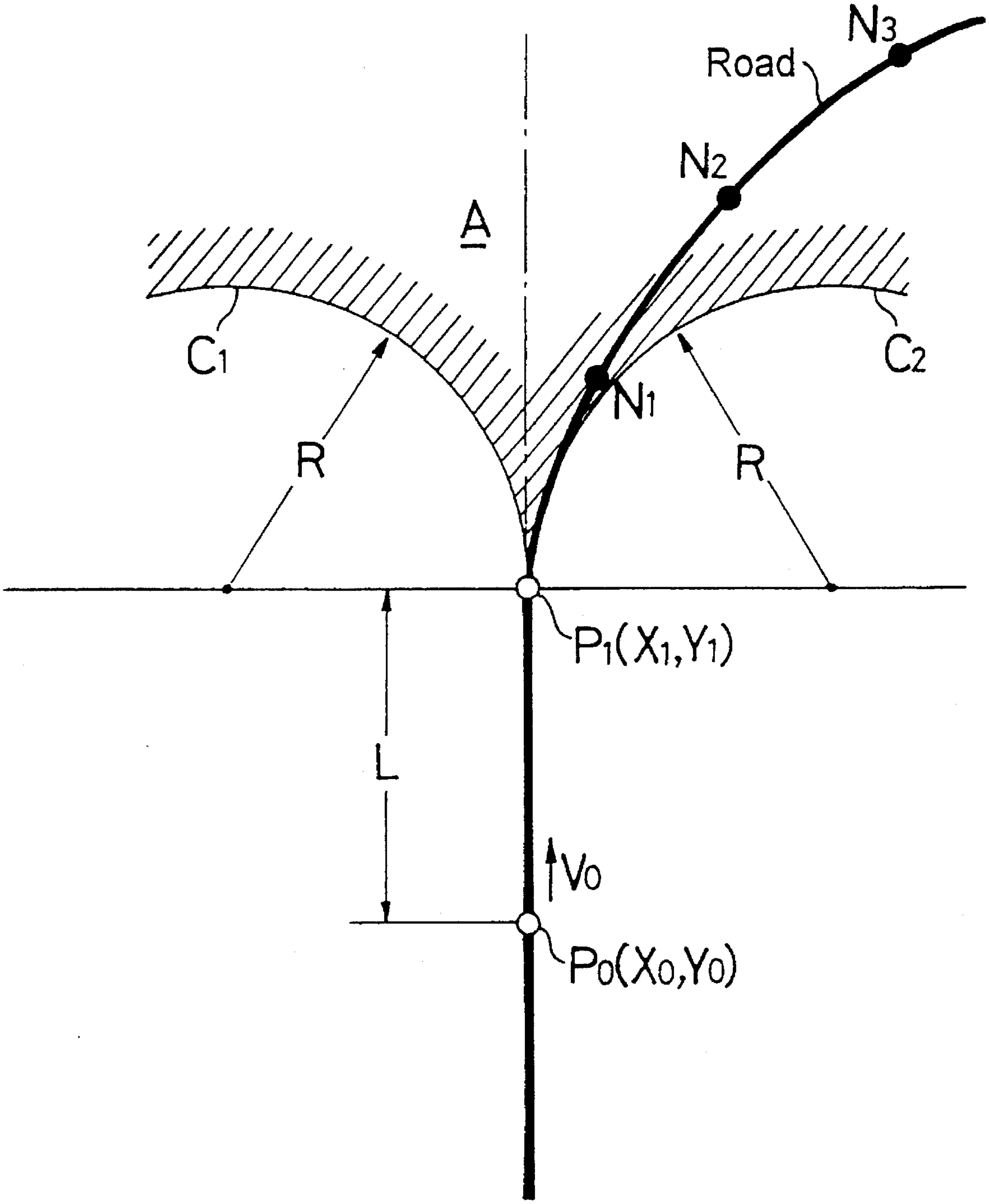
Figure 5:
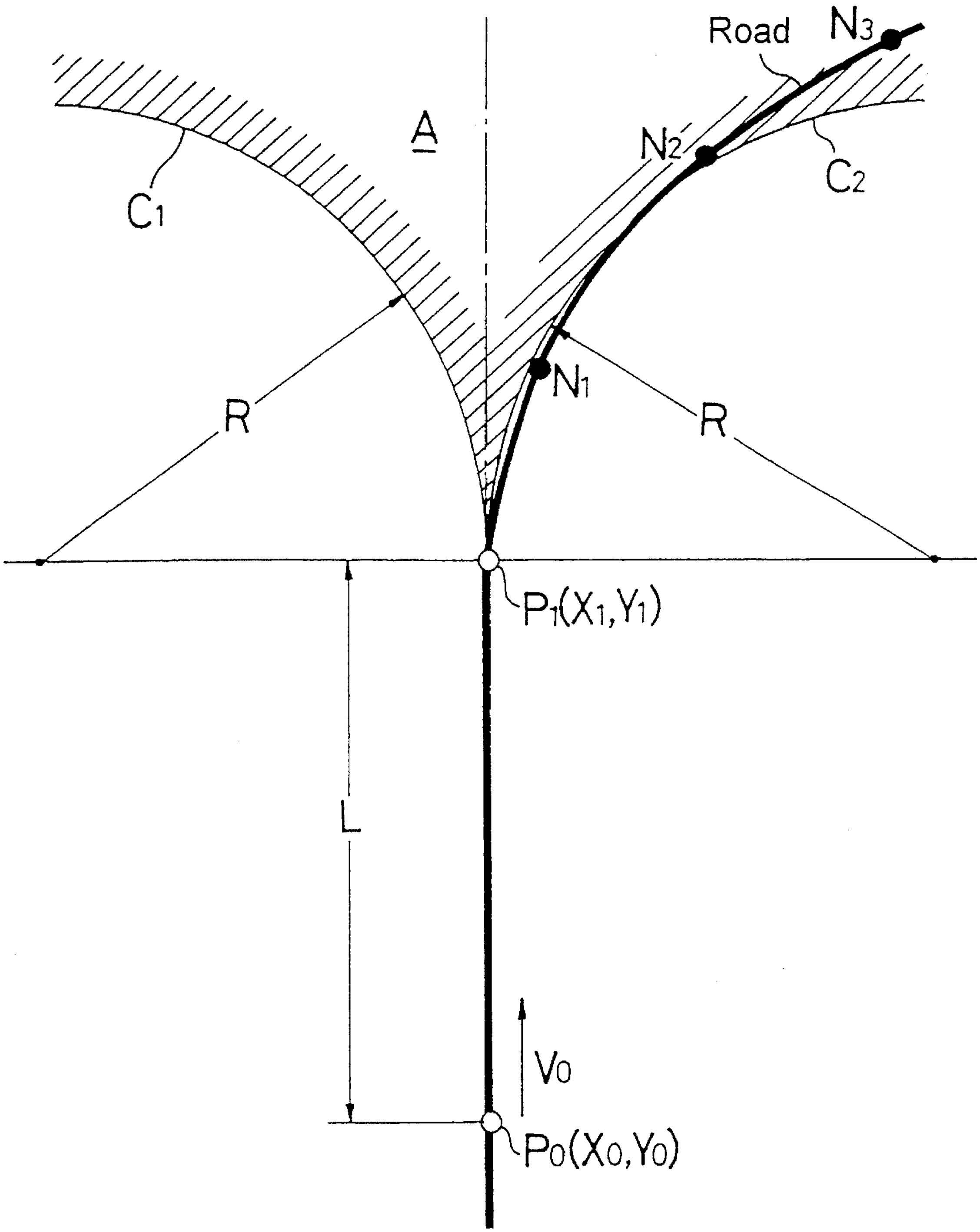

First, a current position $P_0$ ($X_0$, $Y_0$) and a traveling direction of the subject vehicle are detected by the navigating means 1 of the navigation system NV (step S1), and a current vehicle speed $V_0$ is detected by the vehicle speed detecting means 6 (step S2). Then, a preread distance L is calculated on the basis of the vehicle speed $V_0$ (step S3), and a virtual position $P_1$ ($X_1$, $Y_1$) of the subject vehicle ahead in a traveling direction is calculated from the current position $P_0$ ($X_0$, $Y_0$) and the preread distance L (step S4). As shown in FIGS. 4 and 5, the virtual position $P_1$ ($X_1$, $Y_1$) of the subject vehicle is a reference position for performing the judgment of whether it is possible for the vehicle to pass through a corner, and the setting of a vehicle speed $V_{MAX}$ permitting the vehicle to pass through the corner. The preread distance L is determined to be longer as the vehicle speed $V_0$ is larger, so that a sufficient speed-reducing distance can be insured when the current vehicle speed $V_0$ is too large, and the vehicle cannot safely pass through a corner ahead of the virtual position $P_1$ ($X_1$, $Y_1$) of the subject vehicle. Specifically, a time taken until subject vehicle enters the corner is previously set, and the preread distance L is determined by multiplying such time by the vehicle speed $V_0$.

Subsequently, a minimum turnable radius R permitting the turning of the vehicle is map-searched on the basis of the current vehicle speed $V_0$ (step S5). The minimum turnable radius R is larger as the vehicle speed $V_0$ is larger, and the minimum turnable radius is smaller as the vehicle speed $V_0$ is smaller.

Then, a passable area A is calculated. More specifically, two circular arcs $C_1$ and $C_2$ having the same radius equal to the minimum turnable radius R are described so as to be tangent to each other t the virtual position $P_1$ ($X_1$, $Y_1$) of the subject vehicle, and the passable area A is established outside the two circular arcs $C_1$ and $C_2$ (step S6). As shown in FIG. 4, when the vehicle speed $V_0$ is smaller, the minimum turnable radius R is smaller and hence, the passable area A is wider. Conversely, as shown in FIG. 5, when the vehicle speed $V_0$ is larger, the minimum turnable radius R for the vehicle is larger and hence, the passable area A is narrower.

Then, it is judged whether road data from the map information outputting means 2, i.e., a plurality of nodes $N=N_1$, $N_2$, $N_3$ . . . established on a road exist within the passable area A (step S7). If the nodes N exist within the passable area A, as shown in FIG. 4, it is decided that it is possible for the vehicle to safely pass through the corner while maintaining the current vehicle speed $V_0$. Conversely, if any of the nodes N is out of the passable area A, as shown in FIG. 5, it is decided that it is impossible for the vehicle to safely pass through the corner while maintaining the current vehicle speed $V_0$.

Figure 6:
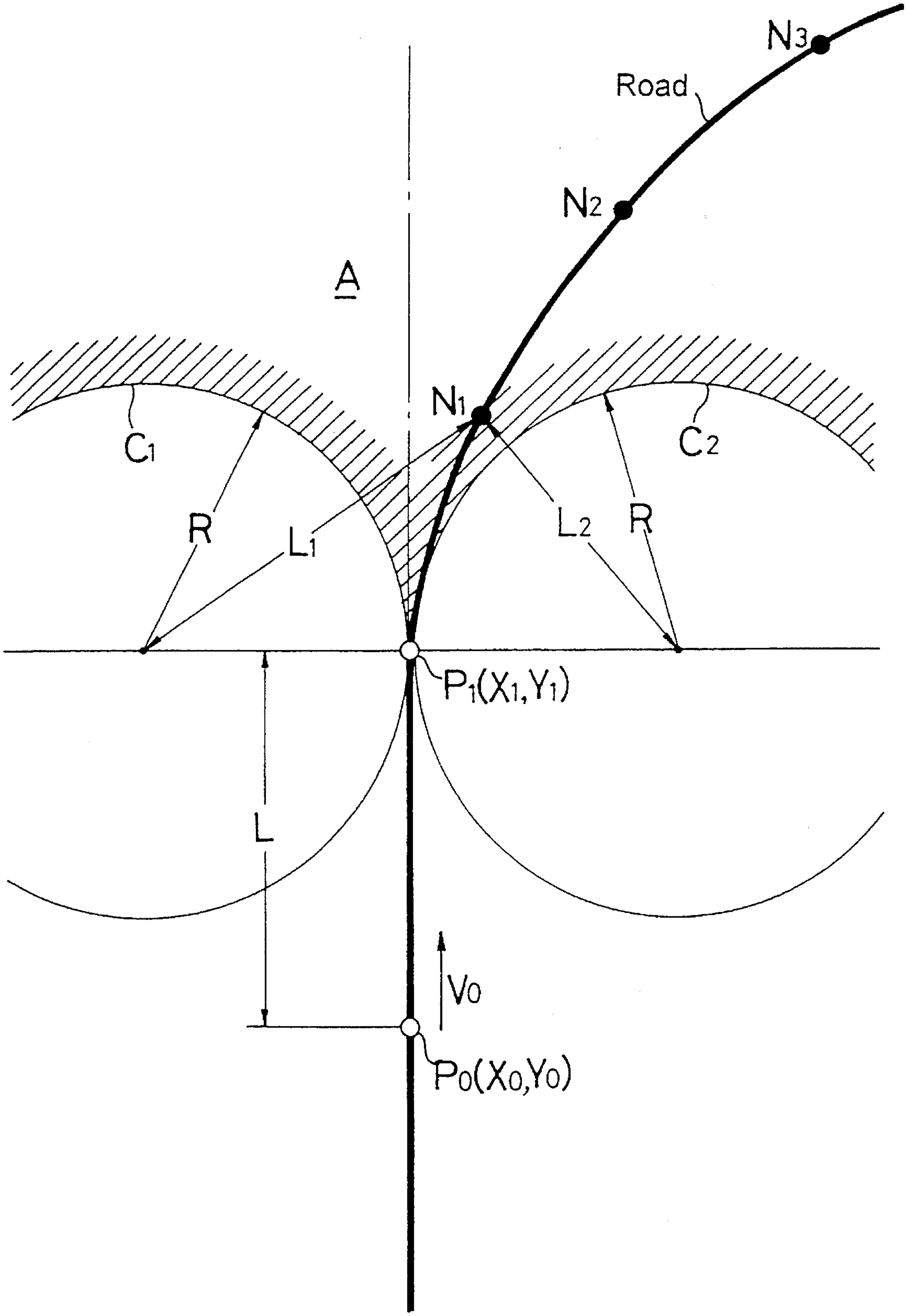
Figure 7:
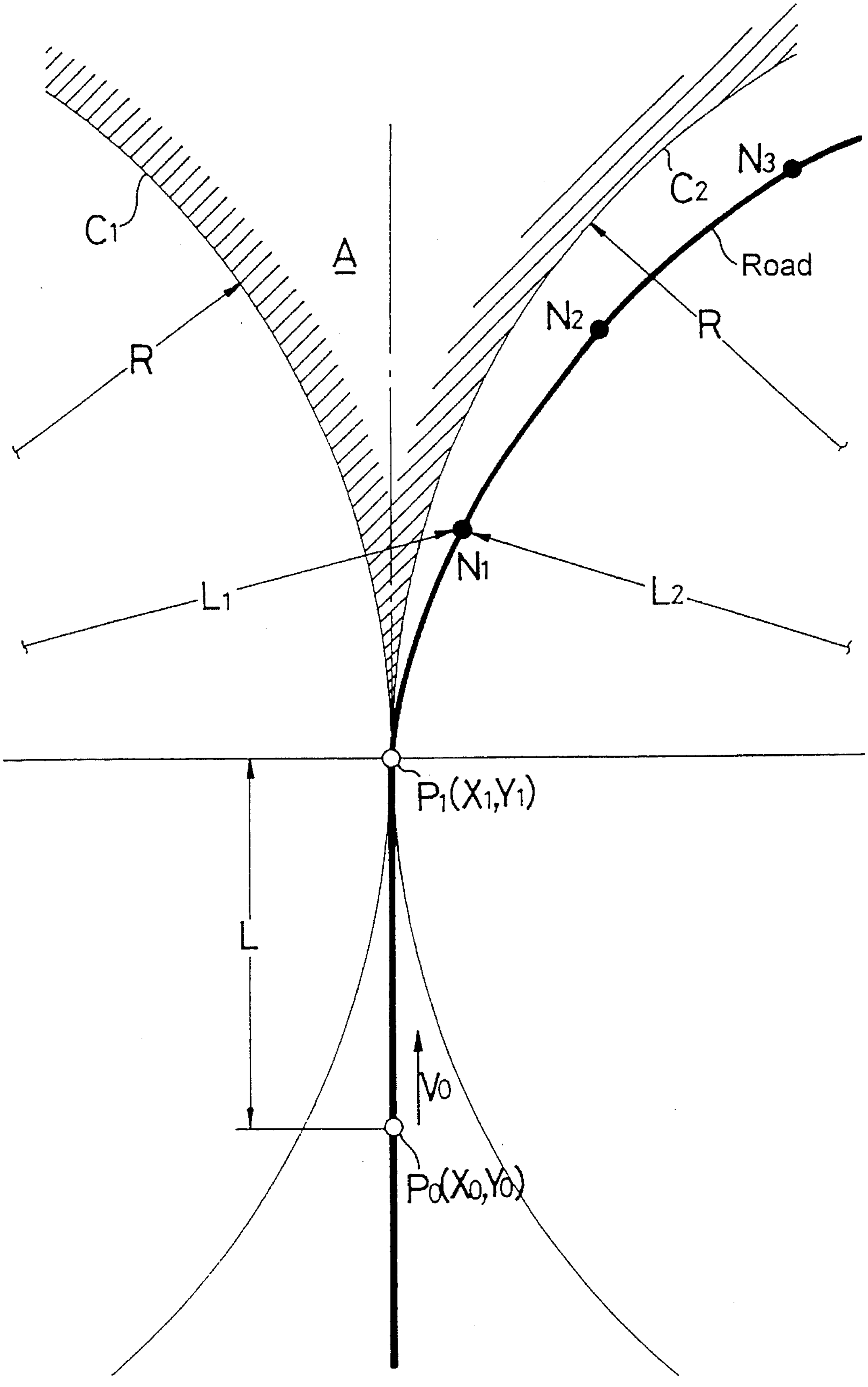

It is judged in a following manner that the nodes N exist either inside or outside the passable area A. As shown in FIG. 6, if both of distances $L_1$ and $L_2$ between centers of the two circular arcs of the radius R and the node N are larger than radius R, it is decided that the node N exists inside the passable area A, and it is possible for the vehicle to pass through the nodes N at the current vehicle speed $V_0$. On the other hand, if one (e.g., $L_2$) of the distances $L_1$ and $L_2$ between centers of the two circular arcs of the radius R and the node N is smaller than the radius R, as shown in FIG. 7, it is decided that the node N exists outside the passable area A, and it is impossible for the vehicle to safely pass through the node N at the current vehicle speed $V_0$.

Figure 8:
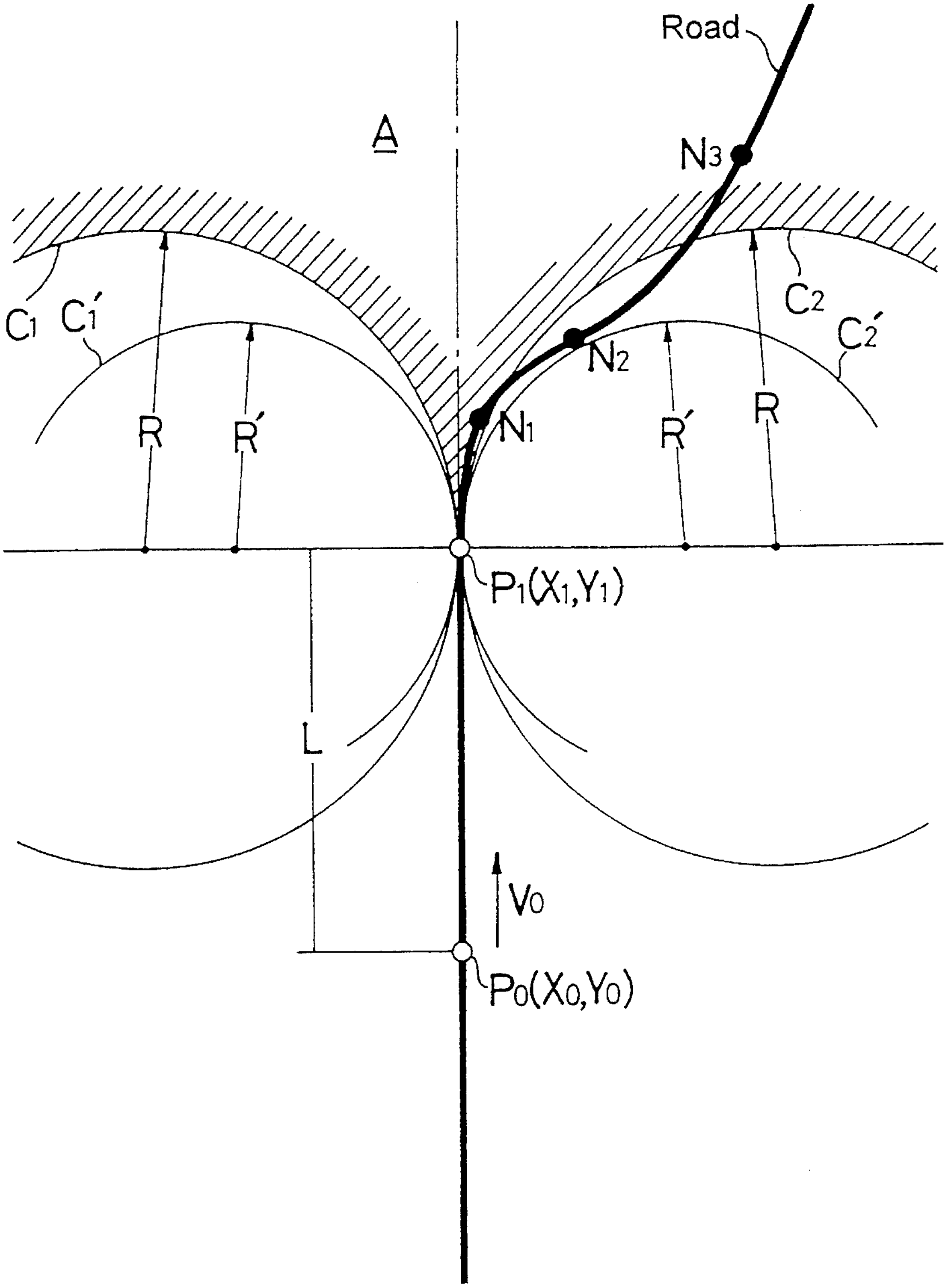

Even if, for example, the nodes $N_1$ and $N_3$ exist inside the passable area A, if the node $N_2$ exists outside the passable area A, as shown in FIG. 8, it is impossible for the vehicle to safely pass through these nodes at that vehicle speed $V_0$. Therefore, it is required that in order to permit the vehicle to safely pass through the corner at the current vehicle speed $V_0$, all the nodes N exist inside the passable area A.

Now, if it is decided at step S7 that it is impossible for the vehicle to pass through the corner, a maximum turnable radius R' required for the vehicle to safely pass through the corner is calculated (step S8). The maximum turnable radius R' is set as a radius R' of circular arcs $C_1'$ and $C_2'$ wherein all the nodes N do not exist inside the circular arcs $C_1'$ and $C_2'$ (see FIG. 8). Thus, if the speed of the vehicle is reduced down to a speed at which the vehicle can be turned at the maximum turnable radius R', it is possible for the vehicle to safely pass through the corner.

Then, a vehicle speed $V_1$ at which the vehicle can be turned at the maximum turnable radius R' is calculated (step S9), and the vehicle speed $V_1$ is set as a passable vehicle speed $V_{MAX}$ (a step S10). On the other hand, if it is decided at step S7 that it is possible for the vehicle to pass through the corner, the processing is advanced to the step S10, at which the current vehicle speed $V_0$ is directly set as the passable vehicle speed $V_{MAX}$. Then, the current vehicle speed $V_0$ and the passable vehicle speed $V_{MAX}$, i.e., if it is impossible for the vehicle to safely pass through the corner, the vehicle speed $V_0$ is controlled by the vehicle speed control means 8 and reduced down to the passable vehicle speed $V_{MAX}$ or less, until the vehicle reaches the virtual position P1 (step S12). This enables the vehicle to reliably pass through the corner.

In reducing the vehicle speed $V_0$ down to the passable vehicle speed $V_{MAX}$ or less, the alarm means 9 can also be used. More specifically, when the current vehicle speed $V_0$ is, for example, within 1.2 times the passable vehicle speed $V_0$, the alarm means 9 such as a lamp, a chime, a buzzer or the like may be operated to give only an alarm. And when the current vehicle speed $V_0$ becomes equal to or more than 1.2 times the passable vehicle speed $V_0$, the vehicle speed control means 8 may be operated to effect the speed reduction.

Then, it is precisely judged whether it is possible for the vehicle to pass through the corner. If it is impossible for the vehicle to safely pass through the corner at a current vehicle speed, the vehicle is permitted to pass through the corner at an appropriate speed by conducting the speed reduction by the vehicle speed control means 8 or by a command from the alarm means 9.

Figure 9:
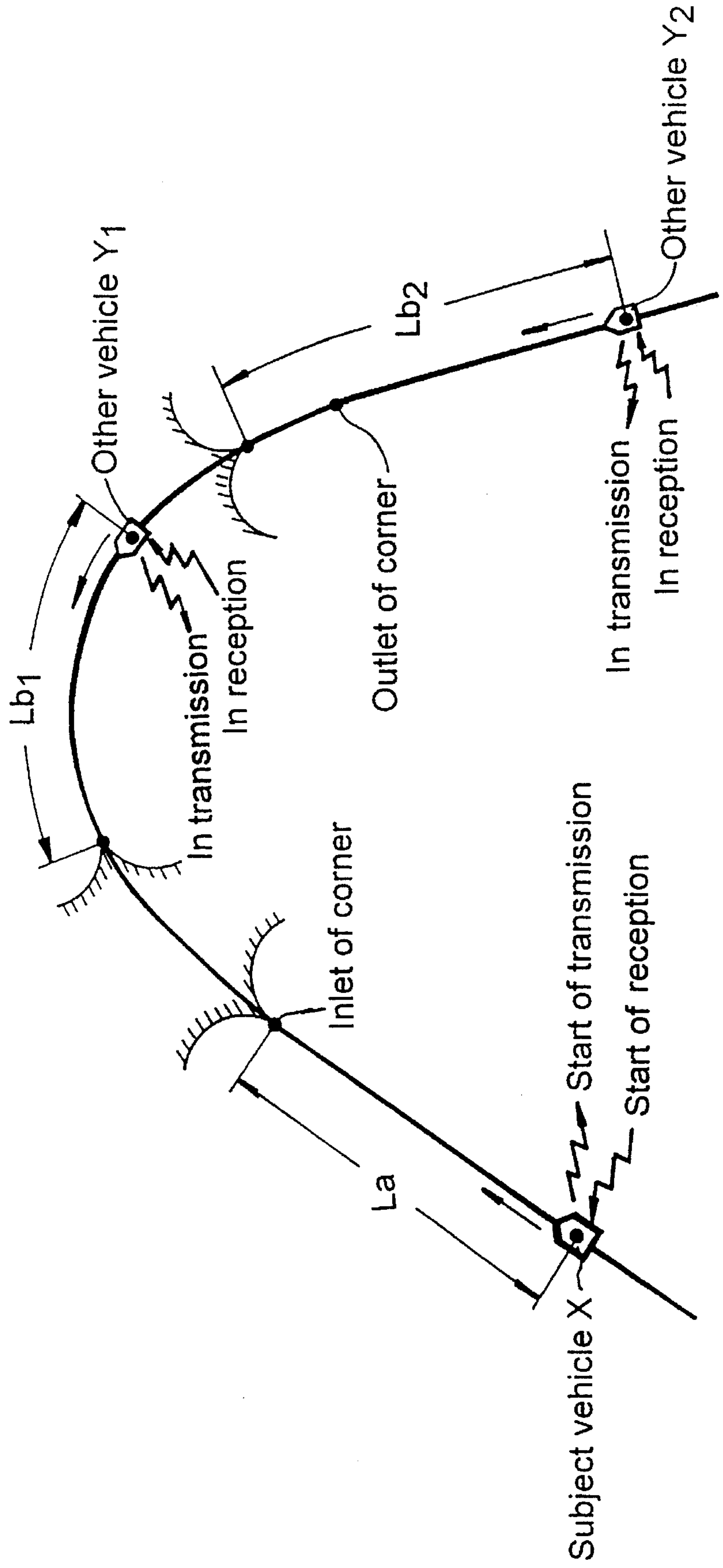

Subsequently, it is judged whether there is a corner existing within the preread distance L calculated at step S3 (step S13). If there is a corner existing within a preread distance La from the subject vehicle X, as shown in FIG. 9, the transmission of data from the subject vehicle X by the transmitting means 11 through the communication means 10 and the reception of data from other vehicles $Y_1$, $Y_2$. . . by the receiving means 12 are started (step S14). In this case, the transmitted data are a current position, a traveling direction and a vehicle speed of the subject vehicle X.

Then, it is judged whether there is another vehicle $Y_1$ which is traveling through a corner which the subject vehicle is intended to enter, or another vehicle $Y_2$ which is intended to enter such corner (i.e., another vehicle $Y_2$ traveling within a preread distance $Lb_2$ from the corner). If there are no other corresponding vehicles $Y_1$ and $Y_2$, it is unnecessary to give an alarm and hence, the processing is returned to the step S1 (step S15). If there is another vehicle $Y_1$ and/or $Y_2$ at step S15, it is judged whether the other vehicle $Y_1$ and/or $Y_2$ is ahead of the subject vehicle X. If there is another vehicle $Y_1$ and/or $Y_2$, but it is behind the subject vehicle X, it is unnecessary to give an alarm and hence, the processing is returned to the step S1 (step S16).

If there is the other vehicle $Y_1$, $Y_2$ ahead of the subject vehicle X, it is judged (step S17) whether the traveling direction of such other vehicle $Y_1$, $Y_2$ is opposite to the traveling direction of the subject vehicle X. If YES, it is judged (step S18) whether the vehicle speed of the other vehicle $Y_1$, $Y_2$ exceeds the passable vehicle speed (see the step S11) at which it is possible for the vehicle to pass through the corner without reduction of its speed. If the vehicle speed of the other vehicle $Y_1$, $Y_2$ does not exceed the passable vehicle speed, the attention of the driver of the subject vehicle is attracted by displaying on the CRT the position of the other vehicle $Y_1$, $Y_2$ which is approaching the subject vehicle and by notifying the driver of the approaching other vehicle $Y_1$, $Y_2$ by the lamp and/or the chime of the alarm means 9 (step S19). On the other hand, if the vehicle speed of the other vehicle $Y_1$, $Y_2$ exceeds the passable vehicle speed, the driver's attention is further strongly attracted by displaying the position of the other vehicle $Y_1$, $Y_2$ on the CRT by flashing in a remarkable or more noticeable manner and by giving an audible warning to the driver, against the approaching of the other vehicle $Y_1$, $Y_2$ at an overspeed, by a buzzer more liable to attract attention than the lamp and the chime (step S20).

If the traveling direction of the subject vehicle is the same as that of the other vehicle at step S17, it is judged whether the other vehicle is being stopped, or is traveling at an extremely low speed. If the other vehicle is traveling in a normal manner, it is not necessary to give an alarm and hence, the processing is returned to the step S1 (step S21). On the other hand, if the other vehicle which is traveling the same direction is being stopped or is traveling at the low speed at step S21, this means that the subject vehicle is rapidly approaching the other vehicle from the rearward in the middle of the corner and hence, the processing is shifted to the step S20 at which the driver's attention is strongly attracted by the flashing of the position of the other vehicle on the CRT and/or by the buzzer of the alarm means 9, for example.

If the subject vehicle has completed passing through the corner, or has passed by the other vehicle while the alarm means is activated (including both of the cases where the traveling direction of the other vehicle is opposite to and the same as the traveling direction of the subject vehicle) (step S22), it is decided that the need for alarming is eliminated. Correspondingly, the system completes the transmission and reception of the data through the transmitting and receiving means 11, 12 and deactivates the alarm means 9, returning to the step S1. When the subject vehicle is turned onto another road from a place short of the corner or from the corner after the start of the transmission and reception of data, the transmission and reception corresponding to the corner are, of course, terminated.

A second embodiment of the present invention will now be described in connection with FIGS. 10 and 11.

Figure 2:
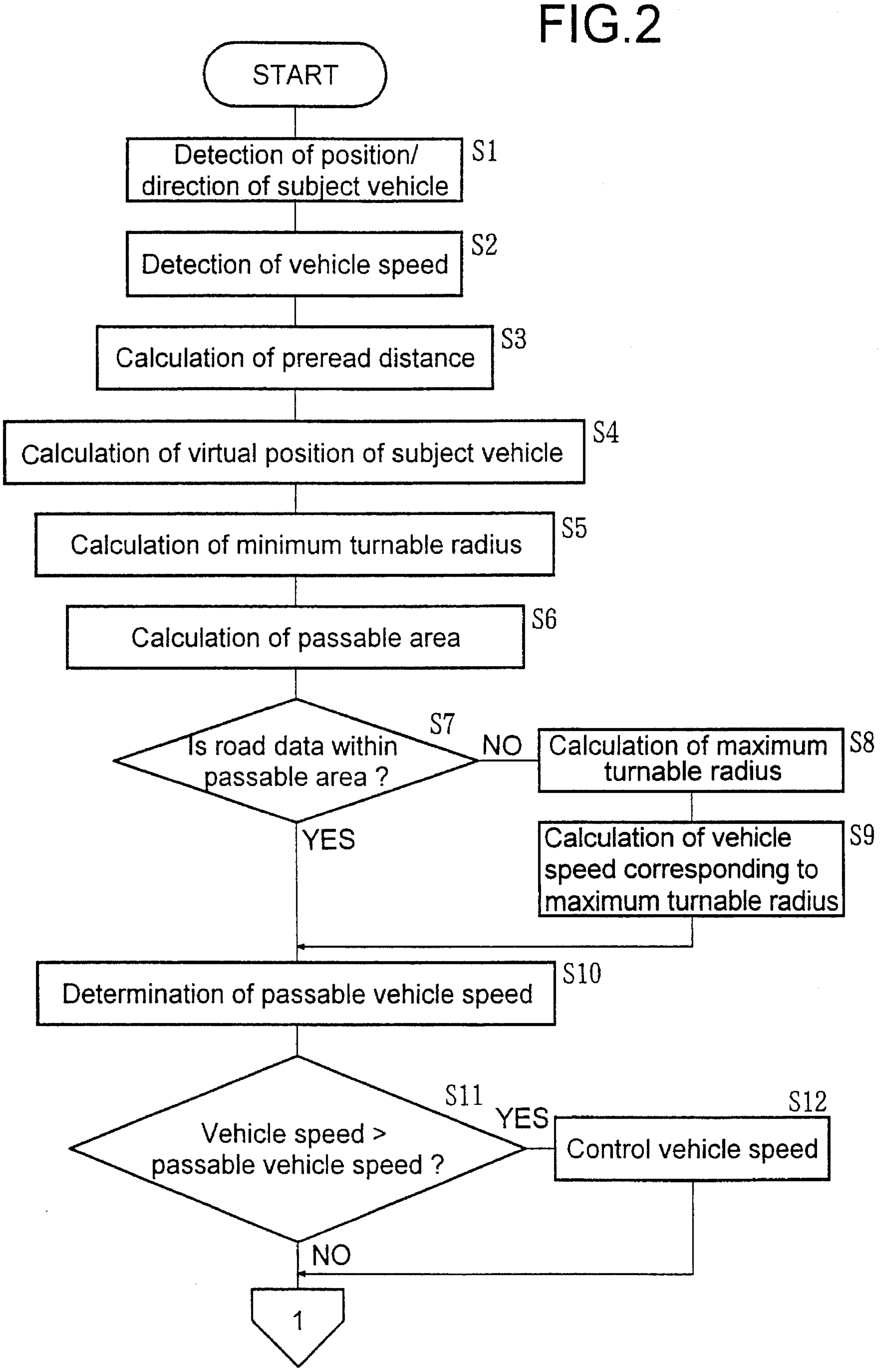
Figure 10:
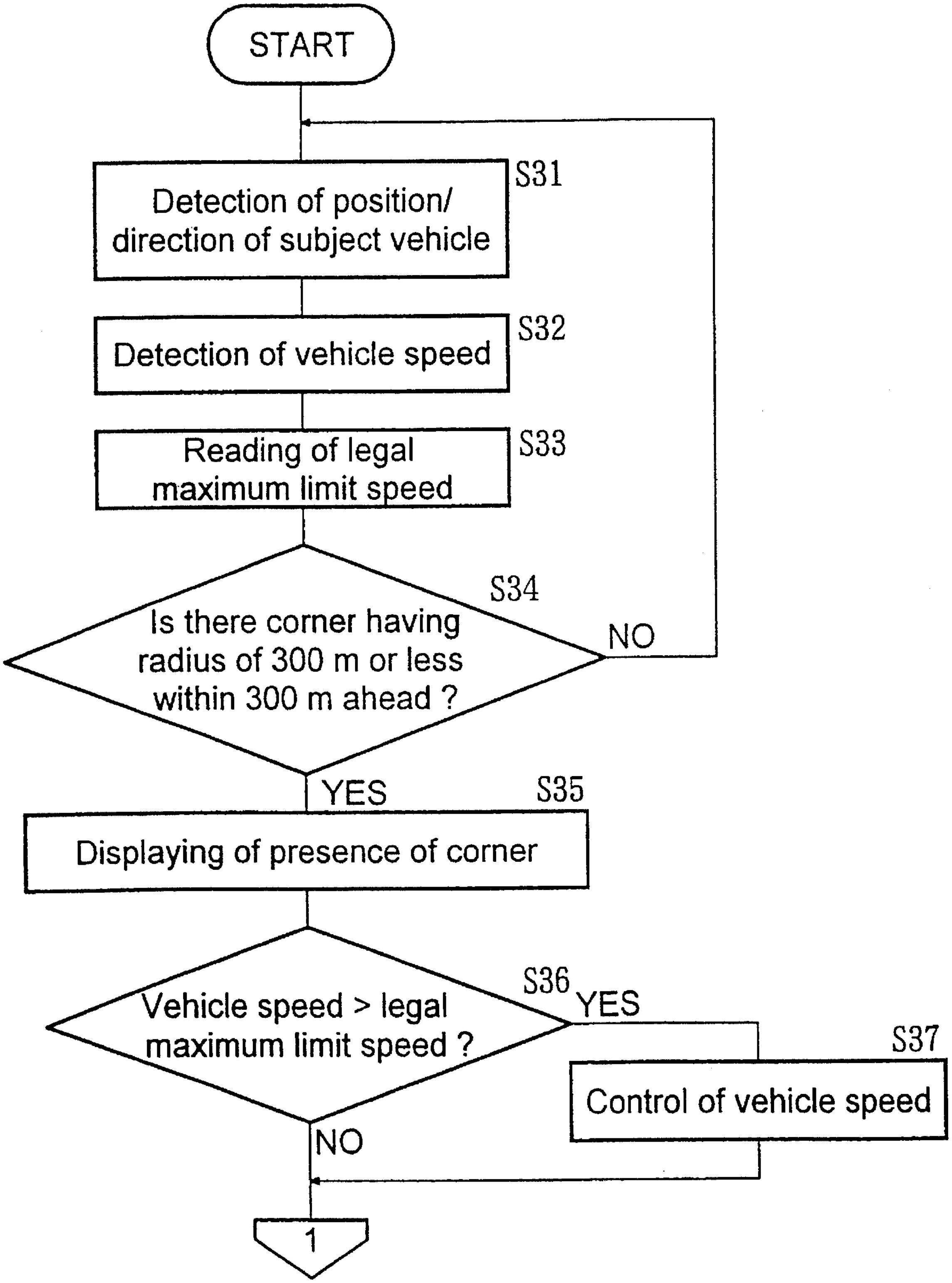
FIG. 10 is a flow chart illustrating the operation of a second embodiment of the present invention.
Figure 11:
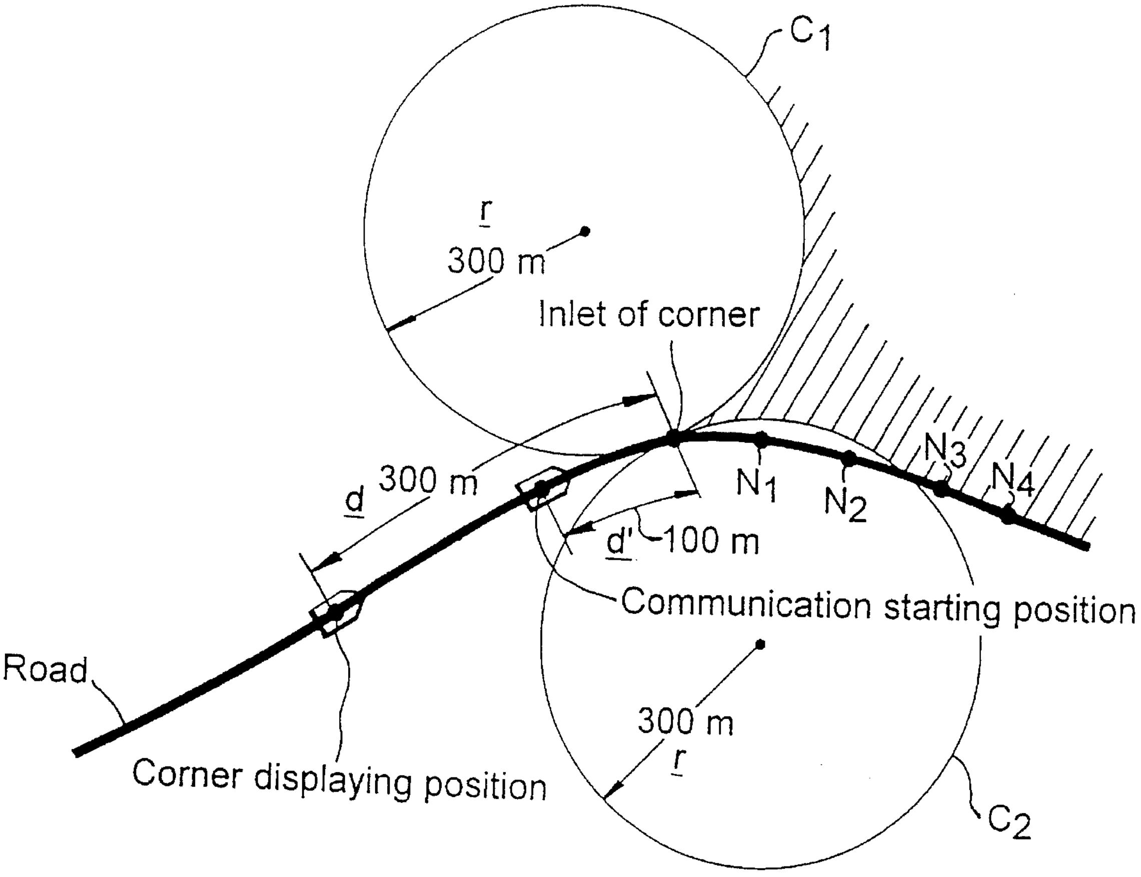
FIG. 11 is a diagram for explaining the technique for detecting the presence of a corner.

A flow chart in FIG. 10 corresponds to the first half of the flow chart in the first embodiment (see FIG. 2). First, after detection of a position, a traveling direction and a vehicle speed of a subject vehicle (at steps S31 and S32), a legal maximum speed limit on a road on which the subject vehicle is now traveling is read (step S33). Then, it is judged (step S34) whether there is a corner having a radius of curvature not more than a predetermined value r (e.g., 300 m) within a predetermined distance d (e.g., 300 m) ahead of the subject vehicle. The judgment of the presence or absence of such corner can be carried out by utilizing the technique described in the first embodiment in addition to the utilization of road curvature data stored in the map information outputting means 2. More specifically, a pair of circular arcs $C_1$ and $C_2$ having a radius r and tangent to left and right opposite sides of a road ahead d of the subject vehicle are described, as shown in FIG. 11. As shown, nodes N1, N2 established on a road are out of an obliquely lined area outside the circular arcs $C_1$ and $C_2$, so it is decided that there is a corner having a radius of curvature equal to or less than the value r.

When it is decided at step S34 that there is the corner having the radius of curvature equal to or less than the value r, the presence of the corner having the radius of curvature equal to or less than the value r is displayed on the CRT by a means, e.g., by flashing of the corner section on the road (step S35). Then, the current vehicle speed is compared with the legal maximum speed limit (step S36). If the vehicle speed exceeds the legal maximum speed limit, the vehicle speed is reduced by the vehicle speed control means 8 (step S37). In this case, a driver may be warned that the vehicle speed is an overspeed by the alarm means 9.

Figure 3:
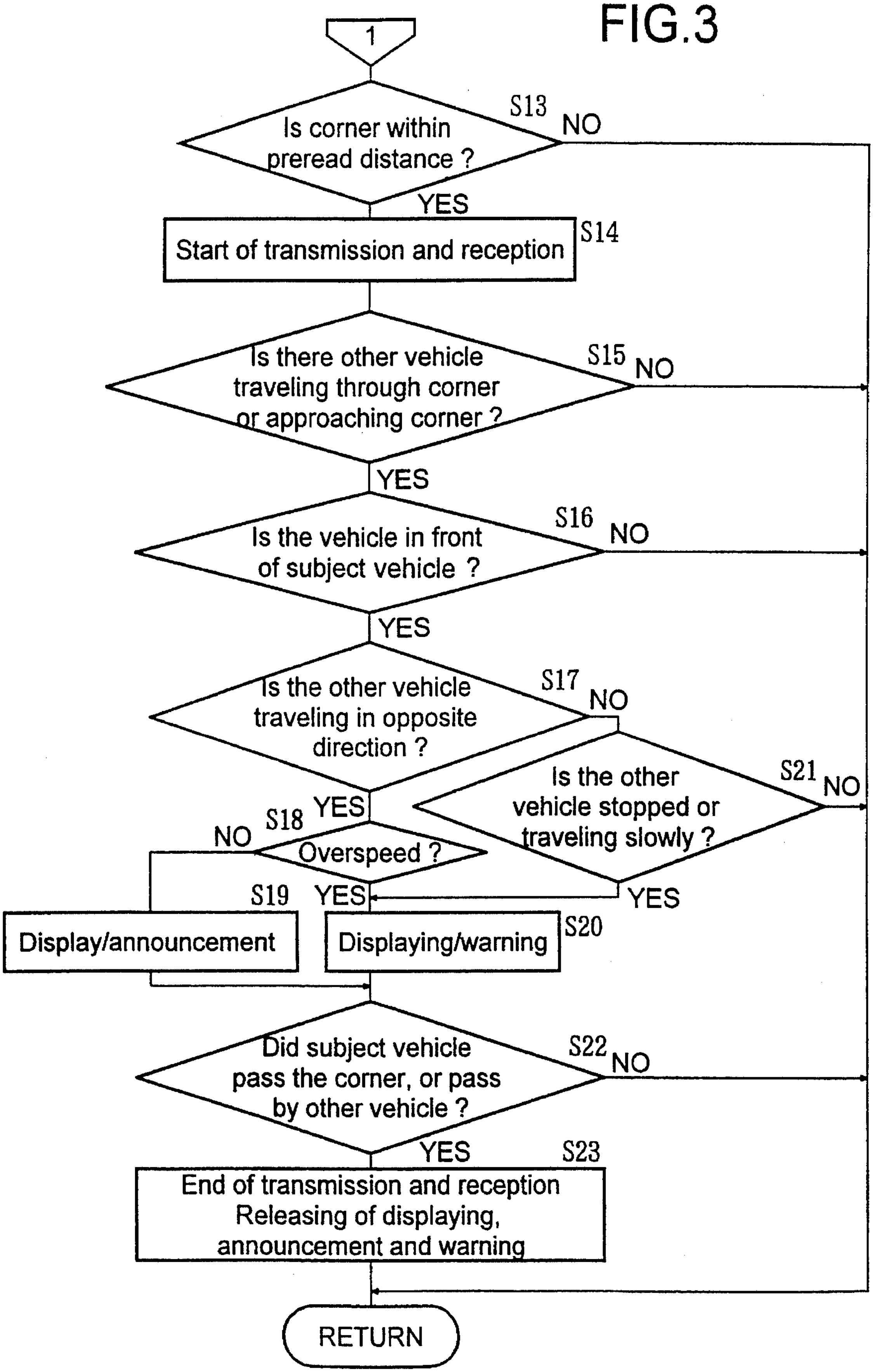

Thereafter, in order to permit the subject vehicle to easily and reliably pass by another vehicle at the corner, the processing is shifted to the step S13 in FIG. 3 at which a control similar to that in the first embodiment is carried out. In the second embodiment, however, the judgment of whether the subject vehicle and another vehicle have approached the corner as at steps S13 and S15 in the flow chart in FIG. 3 is carried out on the basis of a predetermined distance d' (e.g., 100 m) from the corner rather than the preread distance L (see FIG. 11). In addition, the judgment of whether the vehicle speed of the other vehicle is an overspeed as at step S18 is carried out on the basis of the legal maximum limit speed rather than the passable vehicle speed.

Figure 12:
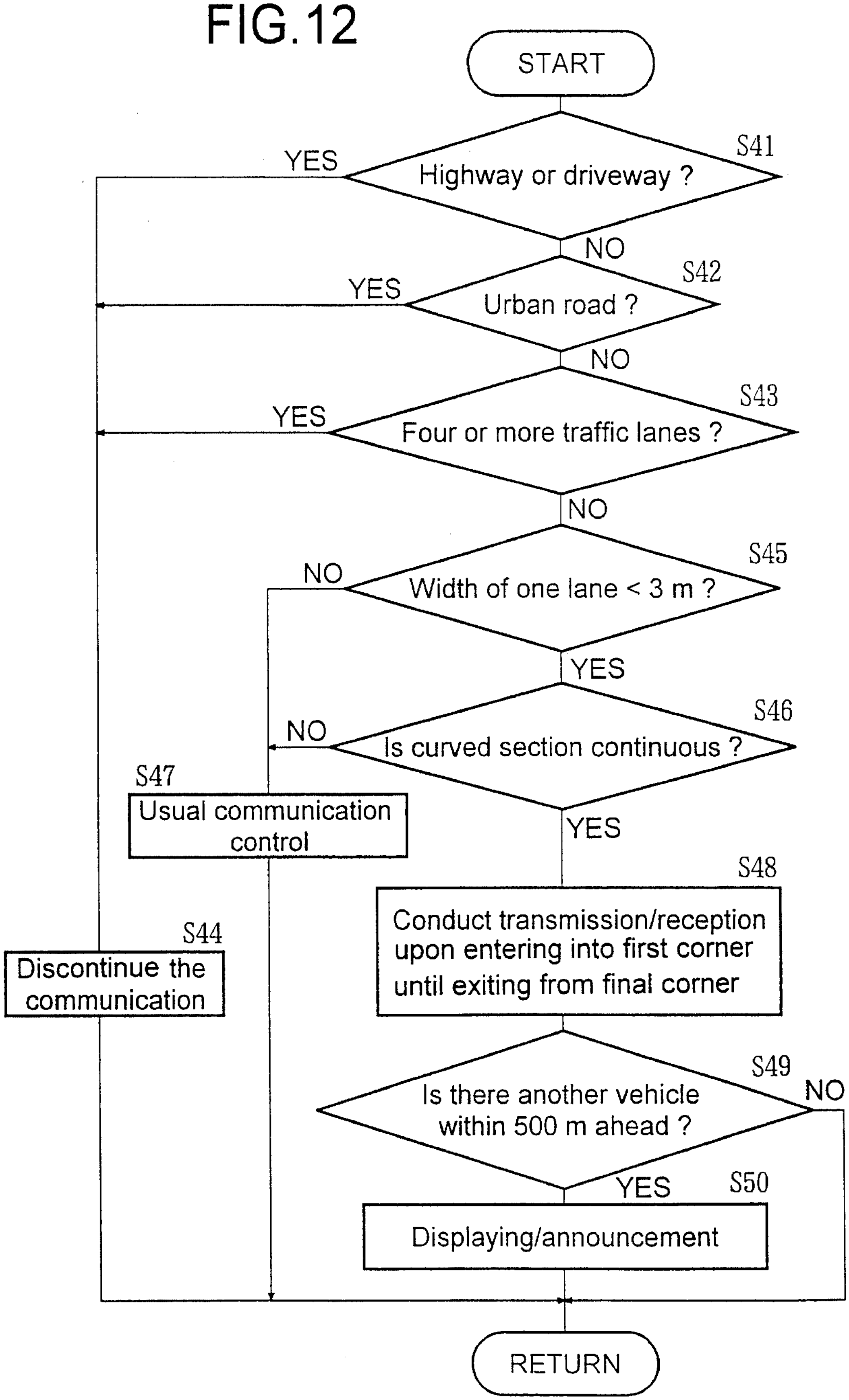
FIG. 12 is a flow chart illustrating the operation of a third embodiment of the present invention.

A third embodiment of the present invention will now be described in connection with FIG. 12.

In the third embodiment, a control of communication between a subject vehicle and another vehicle as described in the first and second embodiments and another special control of communication are selectively carried out on the basis of area judgment data and road section data.

More specifically, the communication between the subject vehicle and other vehicle is discontinued (step S44) in the following three cases: 1) when the subject vehicle is now traveling on a highway or a driveway without any hindrance to its passing by other vehicles (step S41); 2) when the subject vehicle is now traveling on an urban road, and an extremely large number of vehicles exist near the subject vehicle and hence, an extremely large amount of data is provided upon the communications between the subject vehicle and all the other vehicles, resulting in a difficulty to process such data and a possibility that the driver may become disordered by any alarm or other information provided by the system (step S42); and 3) when the subject vehicle is traveling on a road having four traffic lanes with an improved median divider strip without any hindrance to its passing by other vehicles (step S43).

On the other hand, when a road on which the subject vehicle is traveling is not a highway, a driveway, an urban road, or a road having four or more traffic lanes, it is judged (step S45) whether such road has a single traffic lane and a width of 3 m or less. If it is decided at step S45 that the road is relatively wide, or if curved sections are not continuous even if the road is narrow (step S46), the processing is shifted to a step S47, at which the usual communication control described in the first and second embodiment is carried out.

On the other hand, if it is decided at steps S45 and S46 that the road is narrow with a continuous curved section, for example, as is a mountain road, communication control is conducted between the subject vehicle and another vehicle from the time of entering into a first corner to the time of exiting from a final corner (step S48). Data defining the road is previously stored in the map information outputting means 2. When there is another vehicle a predetermined distance (e.g., 500 m or less) ahead of the subject vehicle (step S49), this fact is displayed or notified to the driver by the alarm means 9, involving a CRT, a lamp, a chime or the like. Thus, it is possible for the driver to reliably drive the subject vehicle to pass by other vehicles without any hindrance by sufficiently reducing the speed of the subject vehicle prior to approaching the other vehicle, or by previously shunting the subject vehicle to a turnout zone.

Although the embodiments of the present invention have been described in detail, it will be understood that the present invention is not limited to these embodiments, and that various modifications in design may be made without departing from the spirit and scope of the invention defined in claims.

For example, when the preread distance L and the minimum turnable radius R are determined on the basis of the current vehicle speed $V_0$, they can be corrected or modified on the basis of operational conditions such as the weight of a vehicle body and/or travel surroundings such as the friction coefficient of a road. More specifically, when the weight of the vehicle body is large and the friction coefficient of the road is small, the preread distance L may be set at a large value, and the minimum turnable radius R may be set at a large value. If so, it is possible to perform a more precise judgment and a more precise control.

In addition, a time taken until the subject vehicle passes by another vehicle can be presumed by calculating a relative speed from the vehicle speeds of the subject vehicle and the other vehicle and dividing the distance between the subject vehicle and the other vehicle by such relative speed. Such time may then be displayed to the driver on the CRT, for example, to enable the driver to make sufficient adjustments (if necessary) for such passing-by. Further, if an alarm is given to the subject vehicle driver only in relation to another vehicle by which the subject vehicle will first pass, when the subject vehicle is simultaneously receiving data from a plurality of other vehicles, the driver is not burdened or troubled by simultaneous reception of a plurality of alarms.

When the vehicle speed of the subject vehicle is judged to be excessive or an overspeed by the vehicle speed judging means 3 relative to the passing of the subject vehicle through a corner, a signal indicative of the overspeed may be added to information transmitted to another vehicle, or may be transmitted only when at the overspeed. Thus, in the other vehicle receiving the signal, the need for the other vehicle to calculate the condition of the vehicle transmitting the signal is eliminated. Therefore, it is possible to increase the speed of the warning provided by the system, and also to control the frequency of warnings to the driver by notifying the driver only of vehicles traveling at an overspeed condition.

What is claimed is:

1. An intercommunication system for a vehicle, comprising:

map information outputting means for outputting a map of a road on which a subject vehicle travels;

navigating means for outputting a traveling direction and a current position of the subject vehicle on the map;

judging means for judging on the basis of outputs from said map information outputting means and said navigating means whether a vehicle speed of the subject vehicle is suitable for passing a shape of a road ahead of the subject vehicle;

communication means for transmitting a traveling condition of the subject vehicle to another vehicle when said judging means judges that the vehicle speed of the subject vehicle is unsuitable based on an output from said judging means and for receiving a traveling condition of the another vehicle transmitted from the another vehicle; and alarm means for giving an alarm to a driver of the vehicle based on the received traveling condition of the another vehicle.

2. An intercommunication system for a vehicle according to claim 1, further including vehicle speed control means for controlling the vehicle speed of the subject vehicle based on the output from said judging means.

3. An intercommunication system for a vehicle according to claim 1, wherein said alarm means further gives said alarm to the driver of the subject vehicle based on the output from said judging means.

4. An intercommunication system for a vehicle according to claim 2, wherein said alarm means further gives said alarm to the driver of the subject vehicle based on the output from said judging means.

5. An intercommunication system for a vehicle according to claim 1, wherein said alarm means gives a first alarm when the another vehicle is passing through a corner existing on the road ahead of the subject vehicle and a vehicle speed of the another vehicle is equal to or less than a predetermined reference value, and said alarm means gives a second alarm when the vehicle speed of the another vehicle passing through said corner is equal to or larger than said reference value.

6. An intercommunication system for a vehicle according to claim 1, wherein said judging means further judges, based on the traveling condition of the another vehicle received by said communication means, whether the another vehicle is traveling through a corner existing on the road ahead of the subject vehicle, or is approaching said corner.

7. An intercommunication system for a vehicle according to claim 1, wherein said judging means further judges, based on the traveling condition of the another vehicle received by said communication means, whether a traveling direction of the another vehicle traveling on the road ahead of the subject vehicle is the same as a traveling direction of the subject vehicle.

8. An intercommunication system for a vehicle according to claim 7, wherein when the traveling direction of the another vehicle traveling on a road ahead of the subject vehicle is judged the same as the traveling direction of the subject vehicle, said judging means further judges whether said another vehicle is being stopped or is traveling at a low speed.

9. An intercommunication system for a vehicle according to claim 2, wherein the alarm given by the alarm means is discontinued when the subject vehicle has passed through the corner or has passed by the another vehicle.

10. An intercommunication system for a vehicle according to claim 3, wherein the alarm given by the alarm means is discontinued when the subject vehicle has passed through the corner or has passed by the another vehicle.

11. An intercommunication system for a vehicle according to claim 4, wherein the alarm given by the alarm means is discontinued when the subject vehicle has passed through the corner or has passed by the another vehicle.

12. An intercommunication system for a vehicle according to claim 5, wherein the alarm given by the alarm means is discontinued when the subject vehicle has passed through the corner or has passed by the another vehicle.

13. An intercommunication system for a vehicle according to claim 1, further including means for controlling operation of said communication means based on at least one of a width and a number of traffic lanes of the road ahead of the subject vehicle as established by the map of the road output by said map information outputting means.

14. An intercommunication system for a vehicle according to claim 1, further including means for modifying said output of said judging means based on at least one of an operating condition of the subject vehicle and a travel surrounding of the subject vehicle.

15. An intercommunication system for a vehicle, comprising:

map information outputting means for outputting a map of a road on which a subject vehicle travels;

navigating means for outputting a traveling direction and a current position of the subject vehicle on the map;

judging means for judging on the basis of outputs from said map information outputting means and said navigating means whether a vehicle speed of the subject vehicle is legal for passing a section of a road ahead of the subject vehicle;

communication means for transmitting a traveling condition of the subject vehicle to another vehicle when said judging means judges that the vehicle speed of the subject vehicle is illegal based on an output from said judging means and for receiving a traveling condition of the another vehicle transmitted from the another vehicle; and alarm means for giving an alarm to a driver of the subject vehicle based on the received traveling condition of the another vehicle.

16. An intercommunication system for a vehicle according to claim 15, further including vehicle speed control means for controlling the vehicle speed of the subject vehicle based on the output from said judging means.

17. An intercommunication system for a vehicle according to claim 15, wherein said alarm means further gives said alarm to the driver of the subject vehicle based on the output from said judging means.

18. An intercommunication system for a vehicle according to claim 15, wherein said judging means further judges, based on the traveling condition of the another vehicle received by said communication means, whether the another vehicle is traveling through a corner existing on the road ahead of the subject vehicle, or is approaching said corner.

19. An intercommunication system for a vehicle according to claim 15, wherein said judging means further judges, based on the traveling condition of the another vehicle received by said communication means, whether a traveling direction of the another vehicle traveling on the road ahead of the subject vehicle is the same as a traveling direction of the subject vehicle.

20. An intercommunication system for a vehicle according to claim 15, further including means for controlling operation of said communication means based on at least one of a width and a number of traffic lanes of the road ahead of the subject vehicle as established by the map of the road output by said map information outputting means.

* * * * *